United States Patent
Hsieh et al.

(10) Patent No.: US 8,120,593 B2
(45) Date of Patent: Feb. 21, 2012

(54) METHOD OF POSITIONING COORDINATE

(75) Inventors: Ming-Ta Hsieh, Taipei County (TW); Chien-Ming Lin, Kaohsiung (TW); Chih-Chung Chen, Taichung County (TW); Hsueh-Fang Yin, Kaohsiung (TW); Chia-Lin Liu, Taichung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 423 days.

(21) Appl. No.: 12/541,988

(22) Filed: Aug. 17, 2009

(65) Prior Publication Data

US 2010/0271317 A1    Oct. 28, 2010

(30) Foreign Application Priority Data

Apr. 27, 2009   (TW) ............................... 98113888 A

(51) Int. Cl.
*G06F 3/045* (2006.01)
(52) U.S. Cl. .................. 345/174; 178/18.06; 178/19.03
(58) Field of Classification Search .......... 345/173–183; 178/18.01–18.07, 19.01–19.06
See application file for complete search history.

(56) References Cited

U.S. PATENT DOCUMENTS 5,038,142 A * 8/1991 Flower et al. .................. 341/34
5,327,163 A * 7/1994 Hashimoto et al. ........... 345/173
5,708,460 A * 1/1998 Young et al. .................. 345/173

FOREIGN PATENT DOCUMENTS

CN           1811680         8/2006

OTHER PUBLICATIONS

"1st Office Action of China Counterpart Application", issued on Jun. 9, 2010, p. 1-p. 4, in which the listed reference was cited.

* cited by examiner

*Primary Examiner* — Vijay Shankar
(74) *Attorney, Agent, or Firm* — Jianq Chyun IP Office

(57) ABSTRACT

A method of positioning a coordinate suitable for a touch panel includes following steps. When a touch event occurs, the touch panel generates a corresponding detection coordinate periodically until the touch event ends. When the touch event occurs, the detection coordinate generated by the touch panel is sequentially stored. The touch event is ignored until the number of coordinates generated by the touch panel is greater than or equal to N, and N is a positive integer. When the number of coordinates generated by the touch panel is greater than or equal to N, a touch coordinate corresponding to the touch event is generated according to the last generated N detection coordinates. The above-mentioned step of generating the touch coordinate is repeated according to a cycle of generating the detection coordinate by the touch panel so as to renew the touch coordinate until the touch event ends.

6 Claims, 5 Drawing Sheets

METHOD OF POSITIONING COORDINATE

CROSS-REFERENCE TO RELATED APPLICATION

This application claims the priority benefit of Taiwan application serial no. 98113888, filed on Apr. 27, 2009. The entirety of the above-mentioned patent application is hereby incorporated by reference herein and made a part of specification.

BACKGROUND OF THE INVENTION

1. Field of the Invention

The present application relates to a method of positioning a touch panel. More particularly, the present application relates to a method of positioning a coordinate for better preventing the coordinate drift caused by a trembling finger.

2. Description of Related Art

With rapid development and extensive applications of information technology (IT) products, wireless mobile communication products, and information appliances, people tend to rely on electronic devices little by little. The electronic products including mobile phones, handheld personal computers (PCs), personal digital assistants (PDAs), and smart phones have become ubiquitous in our daily lives. Input devices of the IT products have been changed from conventional keyboards and mice to touch panels so as to comply with requirements for convenience, miniaturization, and being user-friendly. At present, the touch panels can be generally classified into capacitive, resistive, infrared, and ultrasonic touch panels, wherein the resistive touch panels and the capacitive touch panels are most common.

When a touch panel is being receptive to touch of a finger or motion of an object (e.g. a stylus), electric change occurs at locations touched by the finger or the object. The aforesaid electric change is transformed into a control signal and transmitted to a control circuit board of an electronic device. Through data processing and computation by a central processing unit of the electronic device, a display signal is communicated by the control circuit board to a display module, and images are then displayed. It is inevitable to touch the display panel with a trembling finger. Therefore, the electric change caused by the tremble results in a corresponding variation after the electric change is transformed into the control signal. Through computation of the variation, coordinates may drift during a positioning process.

SUMMARY OF THE INVENTION

The present application is directed to a method of positioning a coordinate. By applying the method, erroneous operation arisen from incorrectly touching a touch panel with an input tool can be better prevented and, during a positioning process, the coordinate drift caused by a trembling finger can be precluded.

In the present application, a method of positioning a coordinate suitable for a touch panel is provided. When a touch event occurs, a touch panel generates a corresponding detection coordinate periodically until the touch event ends. The method includes following steps. When the touch event occurs, the detection coordinate generated by the touch panel is sequentially stored. The touch event is ignored until the number of coordinates generated by the touch panel is greater than or equal to N, and N is a positive integer. When the number of coordinates generated by the touch panel is greater than or equal to N, a touch coordinate corresponding to the touch event is generated according to the last generated N detection coordinates. The above-mentioned step of generating the touch coordinate is then repeated according to a cycle of generating the detection coordinate by the touch panel so as to renew the touch coordinate until the touch event ends.

In an embodiment of the present invention, the step of generating the touch coordinate according to the last generated N detection coordinates includes generating the touch coordinate according to an average of a maximum detection coordinate and a minimum detection coordinate from an $(i-N+1)^{th}$ detection coordinate to an $i^{th}$ detection coordinate when the $i^{th}$ detection coordinate is generated by the touch panel. Here, i is a positive integer and is greater than or equal to N.

In an embodiment of the present invention, the step of renewing the touch coordinate further includes following sub-steps. If an $(i+1)^{th}$ detection coordinate exceeds a range from the $(i-N+1)^{th}$ detection coordinate to the $i^{th}$ detection coordinate, the touch coordinate is renewed according to an average of a maximum detection coordinate and a minimum detection coordinate from an $(i-N+2)^{th}$ detection coordinate to the $(i+1)^{th}$ detection coordinate when the $(i+1)^{th}$ detection coordinate is generated by the touch panel. On the other hand, if the $(i+1)^{th}$ detection coordinate falls within the range from the $(i-N+1)^{th}$ detection coordinate to the $i^{th}$ detection coordinate, the touch coordinate remains unchanged.

In an embodiment of the present invention, the step of generating the touch coordinate according to the last generated N detection coordinates includes obtaining a remainder by subtracting the maximum detection coordinate and the minimum detection coordinate among the N detection coordinates from a total sum of the last generated N detection coordinates and then obtaining the touch coordinate by dividing the remainder by (N−2).

Based on the above, multiple coordinates are collectively calculated for preventing erroneous operation arisen from incorrectly touching the touch panel with the input tool and for precluding the coordinate drift caused by the trembling finger during the positioning process.

In order to make the aforementioned and other features and advantages of the present invention more comprehensible, several embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
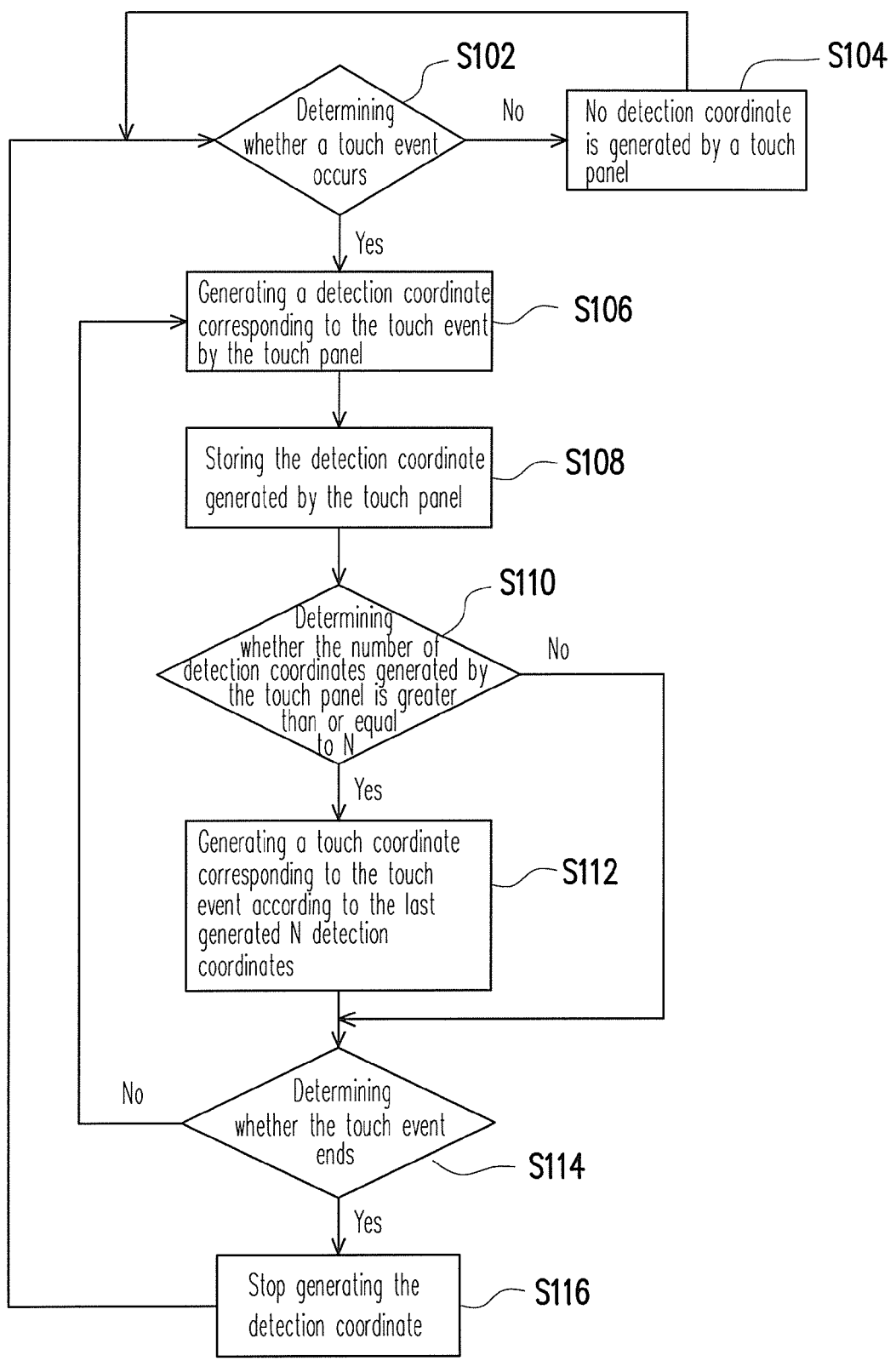
FIG. 1 is a flowchart illustrating a method of positioning a coordinate according to an embodiment of the present invention.

In view of the above, an embodiment of the present invention provides a method of positioning a coordinate. By applying the method, erroneous operation arisen from incorrectly touching a touch panel with an input tool can be prevented, and coordinate drift caused by a trembling input tool during a positioning process can be precluded. Descriptions of the present invention are given below with reference to the embodiments illustrated in accompanying drawings, wherein same or similar steps are denoted with same reference numerals.

FIG. 1 is a flowchart illustrating a method of positioning a coordinate according to an embodiment of the present invention. In the present embodiment, the method of positioning the coordinate is suitable for a touch panel. The touch panel described herein can be a resistive touch panel or a capacitive touch panel. When the touch panel receives the motion of an input tool, a touch event is triggered. The input tool can include a finger or a stylus. When the touch event occurs, the touch panel generates a corresponding detection coordinate periodically until the touch event ends.

Referring to FIG. 1, first, in step S102, whether the touch event occurs or not is determined. When there is no touch event, the touch panel does not generate a detection coordinate (step S104), and step S102 is continuously performed to determine whether the touch event occurs. By contrast, if the touch event occurs, the touch panel generates a detection coordinate corresponding to the touch event (step S106). Next, the detection coordinate generated by the touch panel is stored (step S108), and whether the number of detection coordinates generated by the touch panel is greater than or equal to N is determined (step S110). Here, N is a positive integer. If the number of detection coordinates generated by the touch panel is greater than or equal to N, a touch coordinate corresponding to the touch event is generated according to the last generated N detection coordinates (step S112). Thereafter, whether the touch event ends or not is determined (step S114). If the number of detection coordinates generated by the touch panel is less than N, the touch event is ignored, and whether the touch event ends or not is determined (step S114). In step S114, if it is determined that the touch event is not finished, step S106 is continuously performed to generate the detection coordinate corresponding to the touch event. On the contrary, if it is determined that the touch event is finished, the detection coordinate is no longer generated (step S116), and step S102 is continuously performed to determine whether the touch event occurs or not.

For instance, given that N is equal to 4, when the touch event is triggered at the time the touch panel is touched by a finger, the first detection coordinate to the fifth detection coordinate are sequentially generated by the touch panel periodically. When the first detection coordinate to the third detection coordinate are generated by the touch panel, the three detection coordinates are ignored. Until the touch panel generates the subsequent detection coordinates, i.e. the fourth and the fifth detection coordinates, the touch coordinate corresponding to the touch event is generated according to the last generated four detection coordinates. Thereby, erroneous operation arisen from inadvertently and swiftly touching the touch panel with the finger can be prevented.

Figure 2:
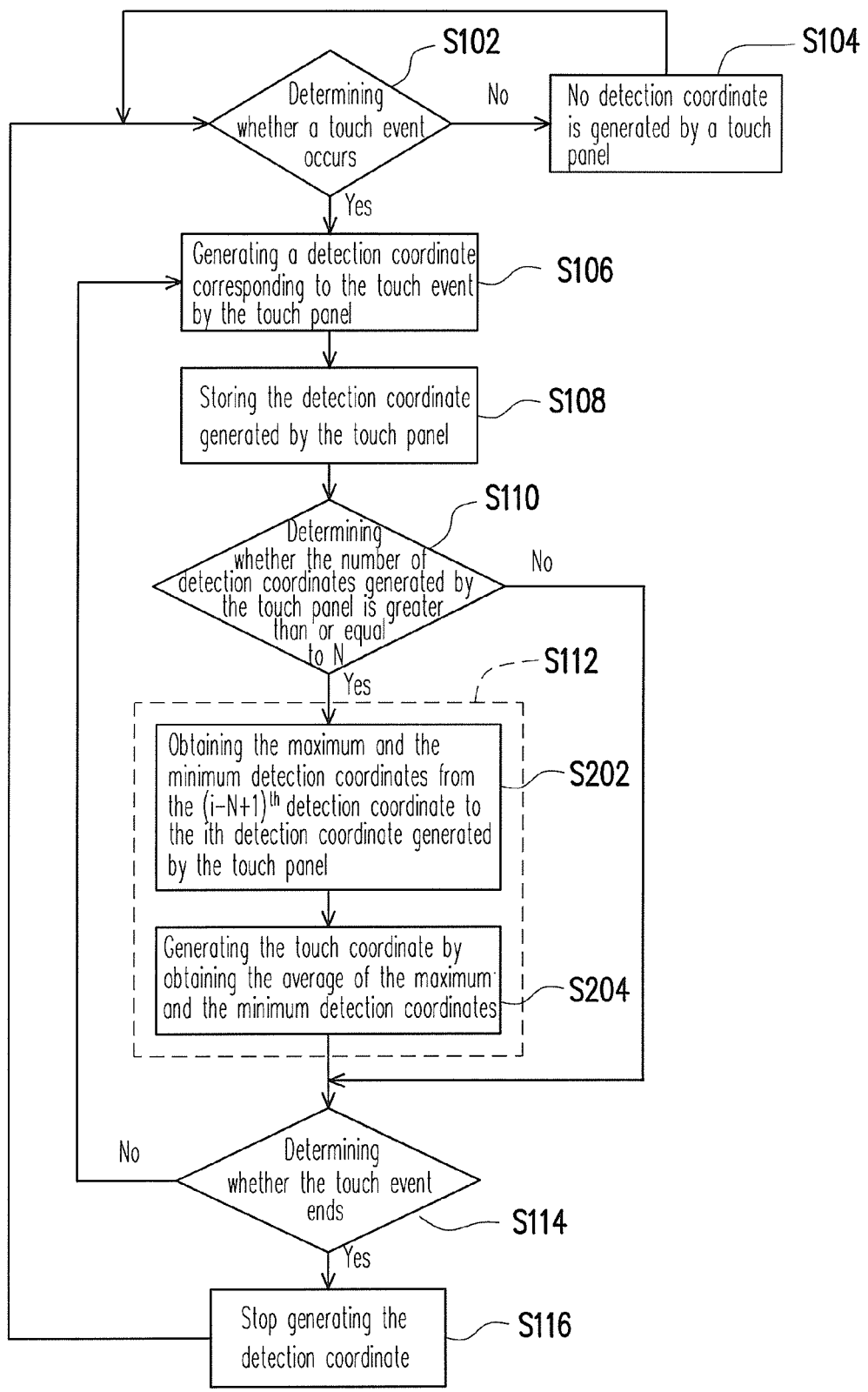
FIG. 2 is a flowchart illustrating a method of positioning a coordinate according to another embodiment of the present invention.

In another embodiment of the present invention, the touch coordinate can be generated according to an average of the last stored N detection coordinates, such that step S112 discussed above is fulfilled. FIG. 2 is a flowchart illustrating a method of positioning a coordinate according to another embodiment of the present invention. The difference between the embodiment depicted in FIG. 1 and that in FIG. 2 lies in that step S112 in FIG. 1 can be replaced by steps S202~S204 of the present embodiment, as indicated in FIG. 2. In step S202, when the $i^{th}$ detection coordinate is generated by the touch panel, the maximum detection coordinate and the minimum detection coordinate are obtained from the $(i-N+1)^{th}$ detection coordinate to the $i^{th}$ detection coordinate, wherein i is a positive integer, and i is greater than or equal to N. Next, the average of the maximum detection coordinate and the minimum detection coordinate is obtained to generate the touch coordinate (S204). In the present embodiment, the $i^{th}$ detection coordinate represents an order of generating the detection coordinate by the touch panel when a touch event occurs. For instance, the detection coordinate generated at first is the first detection coordinate (i=1), the detection coordinate generated secondly is the second detection coordinate (i=2), and so on. When the touch event ends, i becomes zero. When the next touch event occurs, i can be recalculated based on the detection coordinate generated by the touch panel.

For instance, N is assumed to be 4, and the maximum detection coordinate and the minimum detection coordinate among the first, the second, the third, and the fourth detection coordinates are assumed to be the third detection coordinate and the second detection coordinate, respectively. When the last generated detection coordinate is the fourth detection coordinate, the maximum detection coordinate (i.e. the third detection coordinate) and the minimum detection coordinate (i.e. the second detection coordinate) among the first, the second, the third, and the fourth detection coordinates are obtained. Next, an average of the third detection coordinate and the second detection coordinate is obtained to generate the touch coordinate. Likewise, when the last generated detection coordinate is the fifth detection coordinate, the maximum detection coordinate and the minimum detection coordinate among the second, the third, the fourth, and the fifth detection coordinates are obtained. An average of the maximum detection coordinate and the minimum detection coordinate is then obtained to generate a new touch coordinate.

Figure 3:
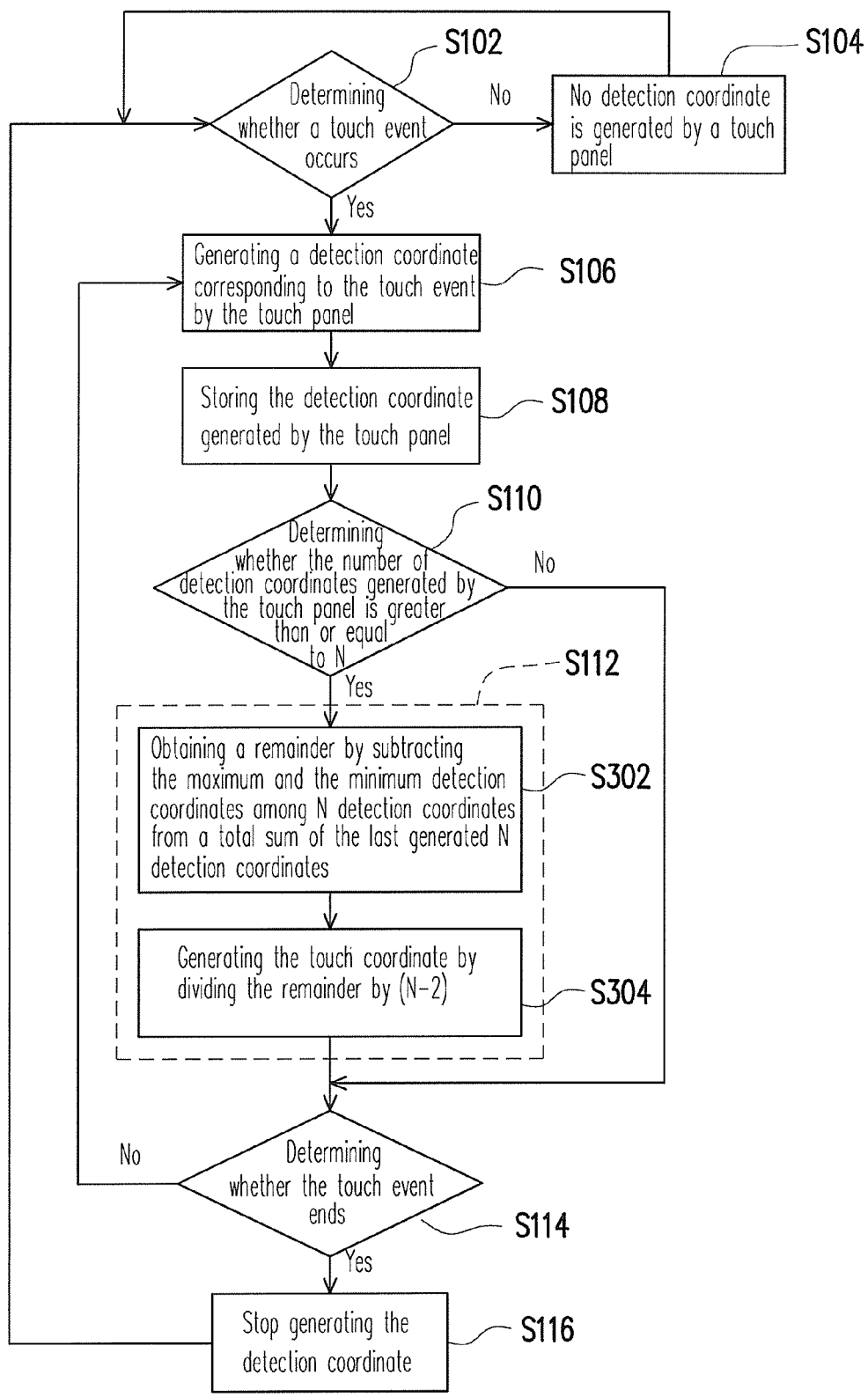
FIG. 3 is a flowchart illustrating a method of positioning a coordinate according to another embodiment of the present invention.

FIG. 3 is a flowchart illustrating a method of positioning a coordinate according to another embodiment of the present invention. The difference between the embodiment depicted in FIG. 1 and that in FIG. 3 lies in that step S112 in FIG. 1 can be replaced by steps S302~S304 of the present embodiment, as indicated in FIG. 3. In step S302, a remainder can be obtained by subtracting the maximum detection coordinate and the minimum detection coordinate among the N detection coordinates from a total sum of the last generated N detection coordinates. The touch coordinate is then generated by dividing the remainder by (N−2) (step S304).

For instance, N is assumed to be 4, and the maximum detection coordinate and the minimum detection coordinate among the first, the second, the third, and the fourth detection coordinates are assumed to be the third detection coordinate and the second detection coordinate, respectively. When the last generated detection coordinate is the fourth detection coordinate, the second and the third detection coordinates can be subtracted from the total sum of the first, the second, the third, and the fourth detection coordinates, such that a remainder is obtained. Next, the reminder is divided by (N−2), i.e. the remainder is divided by 2, so as to generate the touch coordinate. Likewise, when the last generated detection coordinate is the fifth detection coordinate, the maximum and the minimum detection coordinates among the second, the third, the fourth, and the fifth detection coordinates can be subtracted from the total sum of the second to the fifth detection coordinates, such that a remainder is obtained. The reminder is then divided by 2 to generate a new touch coordinate.

Figure 4:
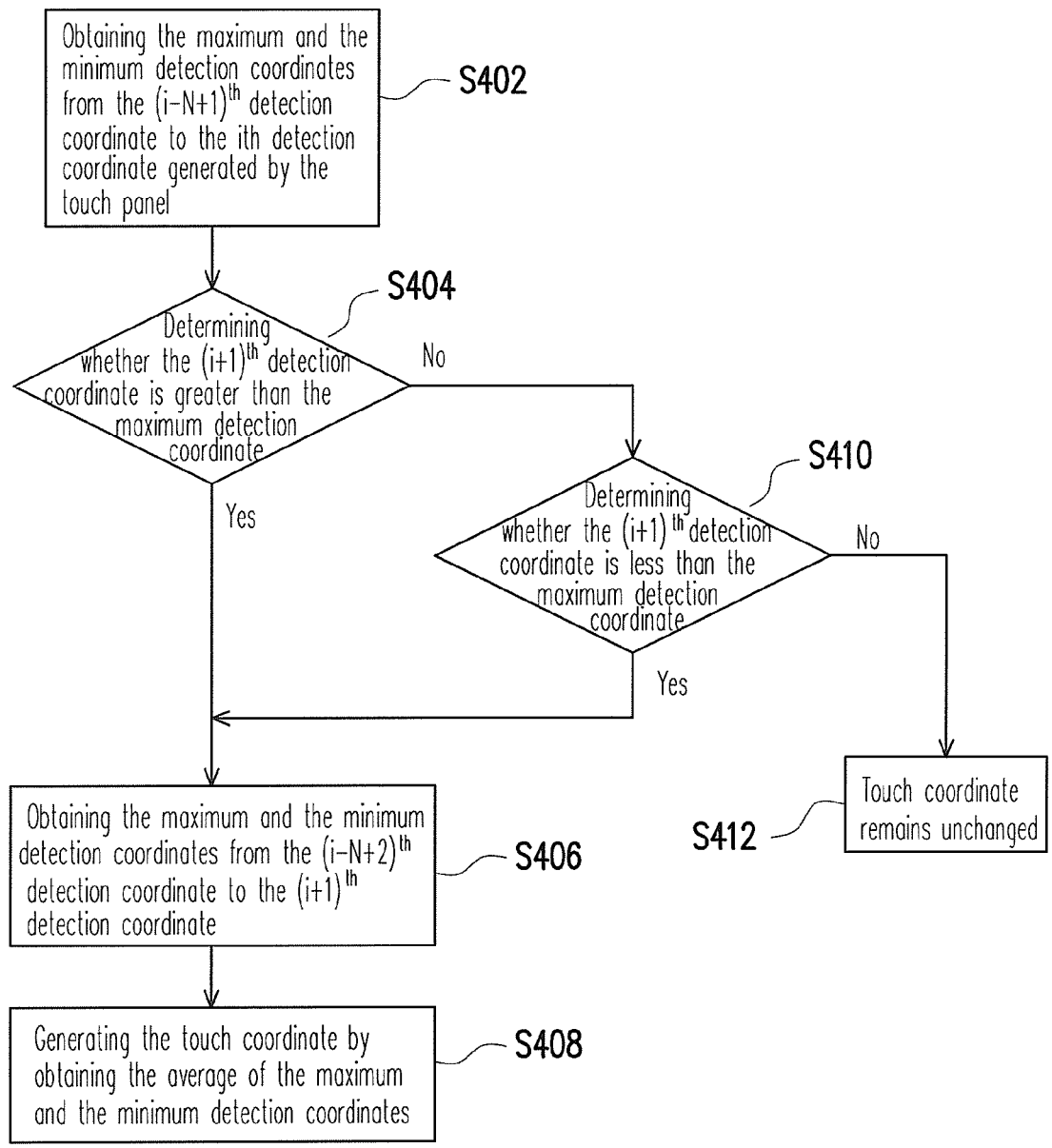
FIG. 4 is a flowchart illustrating a method of generating a touch coordinate corresponding to a touch event based on the last generated N detection coordinates according to an embodiment of the present invention.

In another embodiment of the present invention, a sub-step of determining whether the touch coordinate is renewed according to the detection coordinate generated in the previous cycle can also be added to step S112. FIG. 4 is a flowchart illustrating a method of generating a touch coordinate corresponding to a touch event based on the last generated N detection coordinates according to an embodiment of the present invention. As shown in FIG. 4, first, a maximum detection coordinate and a minimum detection coordinate are obtained from an $(i-N+1)^{th}$ detection coordinate to an $i^{th}$ detection coordinate (step S402). Next, whether an $(i+1)^{th}$ detection coordinate is greater than the maximum detection coordinate is determined (step S404). If the $(i+1)^{th}$ detection coordinate is greater than the maximum detection coordinate, a maximum detection coordinate and a minimum detection coordinate are obtained from an $(i-N+2)^{th}$ detection coordinate to the $(i+1)^{th}$ detection coordinate (step S406). Next, an average of the maximum detection coordinate and the minimum detection coordinate is obtained to generate the touch coordinate (S408).

If the $(i+1)^{th}$ detection coordinate is not greater than the maximum detection coordinate, whether the $(i+1)^{th}$ detection coordinate is less than the minimum detection coordinate is then determined (step S410). If the $(i+1)^{th}$ detection coordinate is less than the minimum detection coordinate, the maximum detection coordinate and the minimum detection coordinate are obtained from the $(i-N+2)^{th}$ detection coordinate to the $(i+1)^{th}$ detection coordinate (step S406). Next, an average of the maximum detection coordinate and the minimum detection coordinate is obtained to generate the touch coordinate (S408). If the $(i+1)^{th}$ detection coordinate is not less than the minimum detection coordinate, the touch coordinate remains unchanged (step S412).

As indicated above, determination on whether the touch coordinate is renewed according to the average of the maximum detection coordinate and the minimum detection coordinate from the $(i-N+2)^{th}$ detection coordinate to the $(i+1)^{th}$ detection coordinate is made by determining whether the $(i+1)^{th}$ detection coordinate exceeds a range from the $(i-N+1)^{th}$ detection coordinate to the $i^{th}$ detection coordinate. Thereby, during the positioning process, the coordinate drift caused by the trembling touch tools can be prevented, and computation resources can be economized.

For instance, N is assumed to be 4, i is assumed to be 5, and the maximum detection coordinate and the minimum detection coordinate among the first, the second, the third, and the fourth detection coordinates are assumed to be the third detection coordinate and the second detection coordinate, respectively. When the last generated detection coordinate is the fifth detection coordinate, whether the fifth detection coordinate exceeds a range from the second detection coordinate to the third detection coordinate is determined. If the fifth detection coordinate exceeds the range from the second detection coordinate to the third detection coordinate, the maximum detection coordinate and the minimum detection coordinate among the second, the third, the fourth, and the fifth detection coordinates are obtained, and then a new touch coordinate is generated by obtaining an average of the maximum detection coordinate and the minimum detection coordinate. If the fifth detection coordinate falls within the range from the second detection coordinate to the third detection coordinate, the touch coordinate remains unchanged.

Moreover, when the initial touch event occurs, the maximum detection coordinate and the minimum detection coordinate can be set to zero. Thereby, the $N^{th}$ detection coordinate is greater than the maximum detection coordinate, and the touch coordinate corresponding to the touch event can be generated according to the last stored N detection coordinates.

Figure 5:
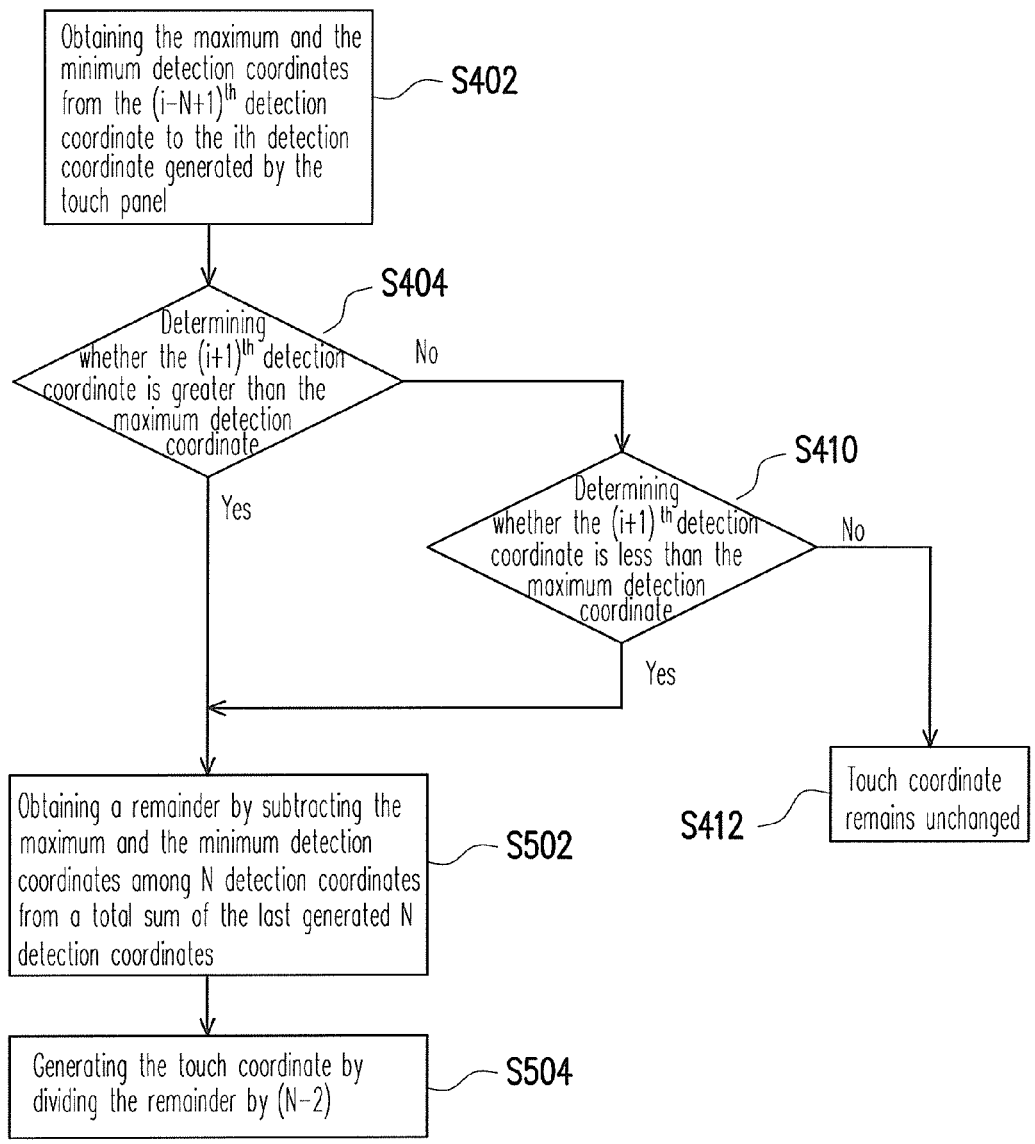
FIG. 5 is a flowchart illustrating a method of generating a touch coordinate corresponding to a touch event based on the last generated N detection coordinates according to another embodiment of the present invention.

FIG. 5 is a flowchart illustrating a method of generating a touch coordinate corresponding to a touch event based on the last generated N detection coordinates according to another embodiment of the present invention. The difference between the embodiment depicted in FIG. 4 and that in FIG. 5 lies in that steps S402~S404 in FIG. 4 can be replaced by steps S502~S504 in FIG. 5. In step S502, a remainder can be obtained by subtracting the maximum detection coordinate and the minimum detection coordinate among the N detection coordinates from a total sum of the last generated N detection coordinates. The touch coordinate is then generated by dividing the remainder by (N−2) (step S504).

For instance, N is assumed to be 4, i is assumed to be 5, and the maximum detection coordinate and the minimum detection coordinate among the first, the second, the third, and the fourth detection coordinates are assumed to be the third detection coordinate and the second detection coordinate, respectively. When the last generated detection coordinate is the fifth detection coordinate, whether the fifth detection coordinate exceeds a range from the second detection coordinate to the third detection coordinate is determined. If the fifth detection coordinate exceeds a range from the second detection coordinate to the third detection coordinate, the maximum detection coordinate and the minimum detection coordinate from the second detection coordinate to the fifth detection coordinate are subtracted from a total sum of the second detection coordinate to the fifth detection coordinate to obtain a remainder. Next, the reminder is divided by (N−2), i.e. the remainder is divided by 2, so as to generate the touch coordinate. If the fifth detection coordinate falls within the range from the maximum detection coordinate to the minimum detection coordinate, the touch coordinate remains unchanged.

In light of the foregoing, a method of positioning a coordinate is provided in the above embodiments. In the method, multiple coordinates are collectively calculated for preventing erroneous operation arisen from incorrectly touching the touch panel with use of the input tool. Moreover, whether the touch coordinate is renewed is determined upon the range from the maximum detection coordinate to the minimum detection coordinate. Thereby, during the positioning process, the coordinate drift caused by the trembling finger can be better prevented, and computation resources can be economized.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A method of positioning a coordinate, the method being suitable for a touch panel, wherein when a touch event occurs, the touch panel generates a corresponding detection coordinate periodically until the touch event ends, the method comprising:
    sequentially storing the detection coordinate generated by the touch panel when the touch event occurs;

ignoring the touch event until the number of coordinate generated by the touch panel is greater than or equal to N, wherein N is a positive integer;

generating a touch coordinate corresponding to the touch event according to the last generated N detection coordinates when the number of coordinates generated by the touch panel is greater than or equal to N; and repeating the step of generating the touch coordinate according to a cycle of generating the detection coordinate by the touch panel, such that the touch coordinate is renewed until the touch event ends.

2. The method of positioning the coordinate as claimed in claim 1, the step of generating the touch coordinate according to the last generated N detection coordinates comprising:

generating the touch coordinate according to an average of a maximum detection coordinate and a minimum detection coordinate from an $(i-N+1)^{th}$ detection coordinate to an $i^{th}$ detection coordinate when the $i^{th}$ detection coordinate is generated by the touch panel, wherein i is a positive integer, and i is greater than or equal to N.

3. The method of positioning the coordinate as claimed in claim 1, the step of generating the touch coordinate according to the last generated N detection coordinates comprising:

obtaining a remainder by subtracting a maximum detection coordinate and a minimum detection coordinate among the N detection coordinates from a total sum of the last generated N detection coordinates and obtaining the touch coordinate by dividing the remainder by (N−2).

4. The method of positioning the coordinate as claimed in claim 1, wherein N is equal to 4.

5. The method of positioning the coordinate as claimed in claim 1, wherein the touch event is triggered by an input tool touching the touch panel.

6. The method of positioning the coordinate as claimed in claim 5, wherein the input tool comprises a finger or a stylus.

* * * * *